United States Patent [19]

Azpûrua et al.

[11] Patent Number: 5,010,845
[45] Date of Patent: Apr. 30, 1991

[54] REPTILE CAGE APPARATUS

[76] Inventors: Diana M. Azpûrua; Francisco J. Azpurua, both of Shore Base Yacht Service, Oficina, Postal Telegraphica, Pampatar Margarita, Venezuela, 6316

[21] Appl. No.: 493,820
[22] Filed: Mar. 15, 1990
[51] Int. Cl.$^5$ ............................................. A01K 1/00
[52] U.S. Cl. ..................................................... 119/17
[58] Field of Search ................... 119/5, 17, 35, 37, 41, 119/19; 47/69

[56] References Cited

U.S. PATENT DOCUMENTS

| 3,088,436 | 5/1963 | Lyon | 119/37 |
| 3,584,605 | 6/1971 | Schwartz et al. | 119/37 |
| 4,122,800 | 10/1978 | Mangarell | 119/5 |
| 4,188,909 | 2/1980 | Spivak | 119/5 |
| 4,754,571 | 7/1988 | Riechmann | 119/5 X |
| 4,787,336 | 11/1988 | Lineberry | 119/5 |

FOREIGN PATENT DOCUMENTS

| 3226141 | 1/1984 | Fed. Rep. of Germany | 119/5 |
| 1180798 | 2/1970 | United Kingdom | 119/5 |

Primary Examiner—Robert P. Swiatek
Assistant Examiner—Todd E. Manahan
Attorney, Agent, or Firm—Leon Gilden

[57] ABSTRACT

The apparatus includes a transparent enclousre formed with a plurality of heating sources, including a thermostatically controlled resistance heater with a spaced infra-red light source mounted in association with a thermostat to effect heating of the interior of the enclosure. Further, a humidifier in association with a humidistat is mounted in a spaced relationship relative to the heating sources utilizing a separate humidistat to effect selective operation of the humidifier. A flexible heat reflector web is mounted and suspended from an upper framework of the enclosure and suspended from an upper framework of the enclosure and directed downwardly thereof and is selectively furled to selectively provide various heat ranges within the enclosure. Further, the transparent web may be formed of flexible fingers to ease access of a reptile contained within the enclosure between spaced heating zones within the enclosure. A cover is also provided for the organization.

4 Claims, 4 Drawing Sheets

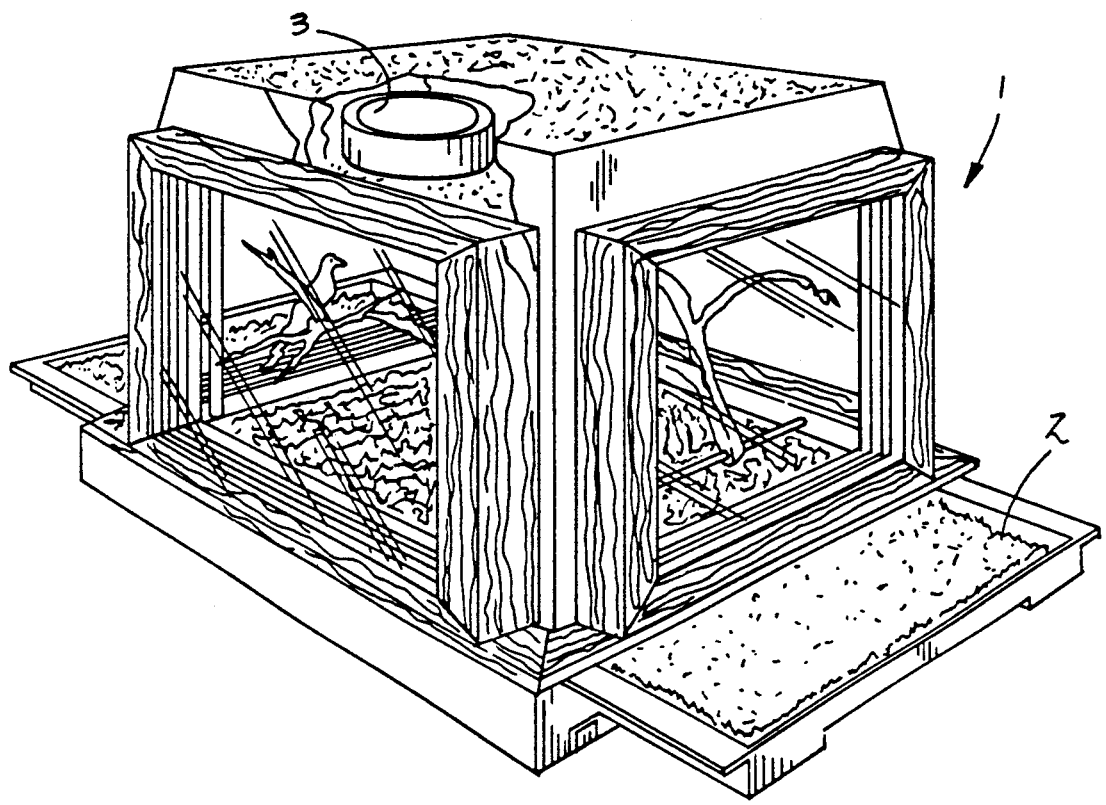
Fig 1
PRIOR ART
Fig 2
PRIOR ART
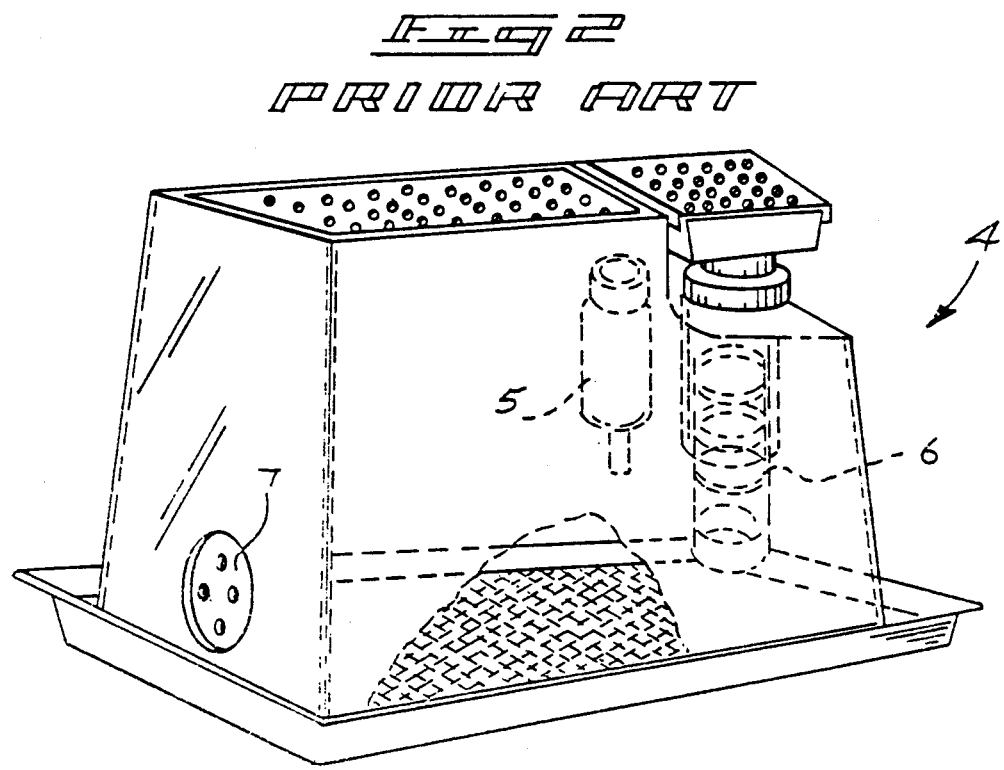

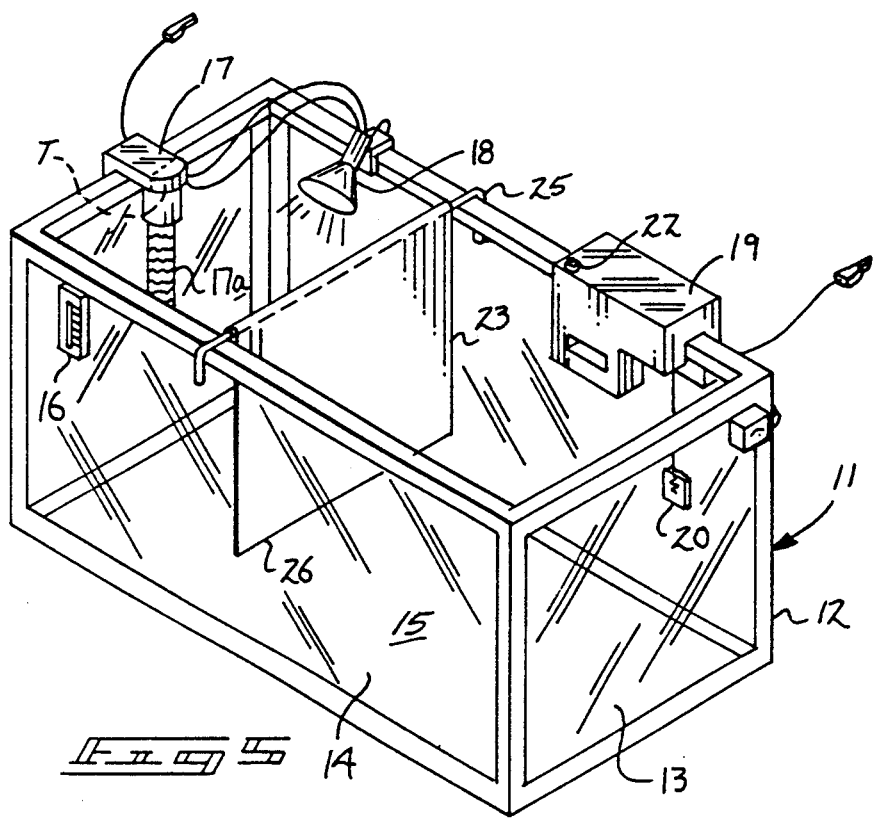
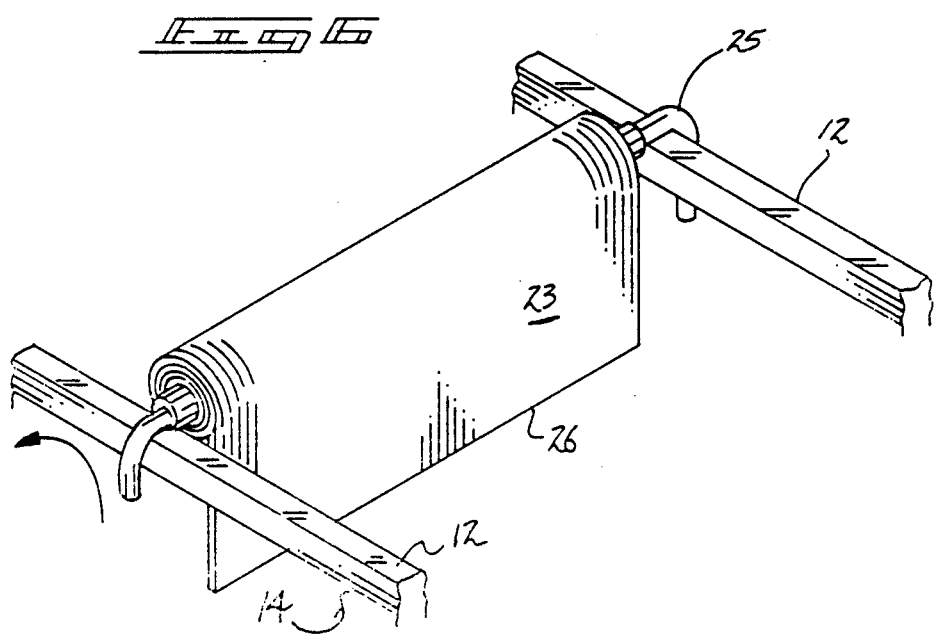

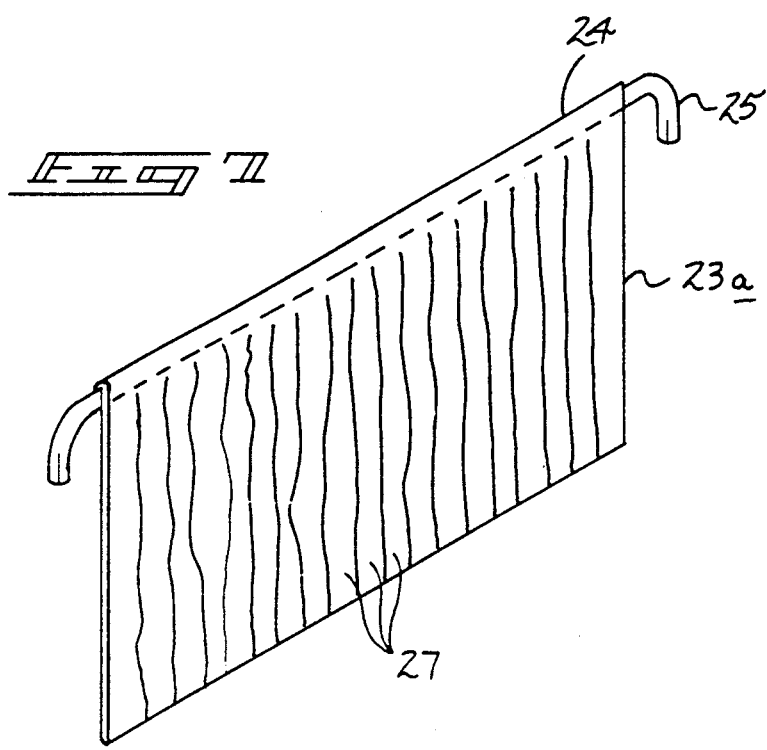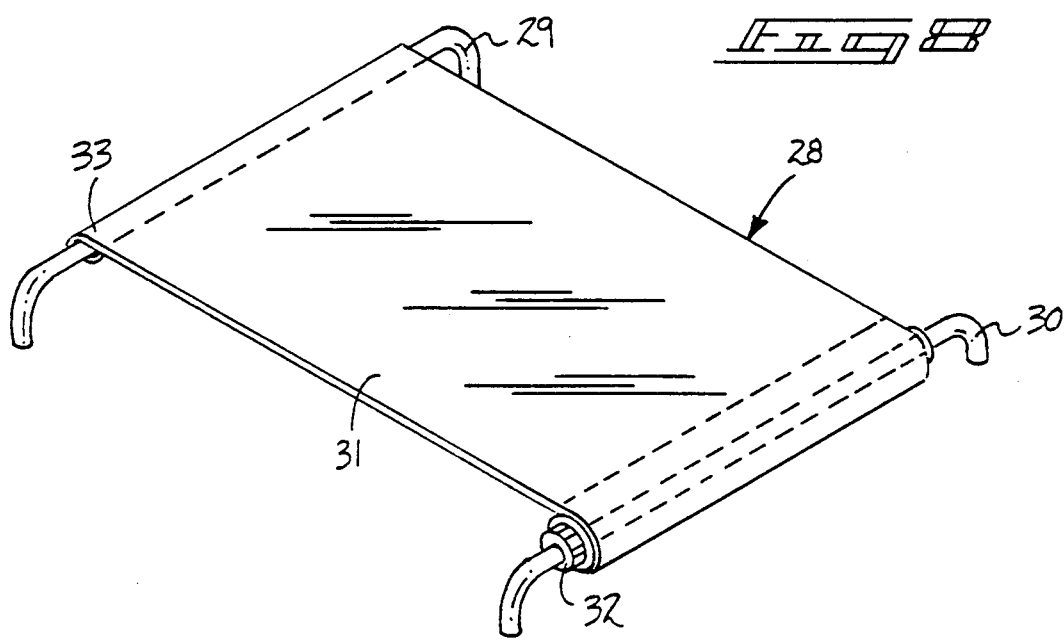

REPTILE CAGE APPARATUS

BACKGROUND OF THE INVENTION

1. Field of the Invention

The field of invention relates to animal cage enclosures, and more particularly pertains to a new and improved reptile cage apparatus providing a controlled environment particularly arranged for occupation a reptile therewithin.

2. Description of the Prior Art

Reptiles being of cold-blooded physiology require a controlled environment particular to that species. Examples of the prior art include U.S. pat. No. 4,552,093 to Puckett setting forth an animal enclosure including adjustable transparent panels supportable within a framework, as well as an air filter arrangement directed to draw fresh air into the enclosure, with the enclosure particularly arranged for housing of birds and the like therewithin utilizing perches and grass seed trays positioned in surrounding and an interior relationship relative to the enclosure.

U.S. Pat. No. 3,791,346 to Willinger sets forth a rodent habitat utilizing a transparent housing, with an open bottom portion and a screen across the bottom portion for receiving debris directed from the enclosure. Various watering and exercise apparatus are provided within the organization.

U.S. Pat. No. 3,830,201 to Coulbourn sets forth a test cage for animals, wherein modules defining the test cage are held in place by a plate partially covering the top of the cage wherein testing devices may be selectively positioned within a wide range of locations on test walls of the organization.

U.S. Pat. No. 3,774,576 to Moore sets forth an animal cage utilizing a series of organizations to provide various activities in association with the animal.

U.S. Pat. No. 4,154,196 to Gass provides an animal metabolism unit for encasing a test animal and collecting separating matter excreted by the animal for further testing procedures.

As such, it may be appreciated that there continues to be a need for a new and improved reptile cage apparatus wherein the same addresses both the problems of ease of use, as well as effectiveness in housing a particular animal, such as a reptile, in a controlled environment and in this respect, the present invention substantially fulfills this need.

SUMMARY OF THE INVENTION

In view of the foregoing disadvantages inherent in the known types of animal cages now present in the prior art, the present invention provides a reptile cage apparatus wherein the same provides a controlled environment providing necessary heat and humidity for housing of a reptile therewithin. As such, the general purpose of the present invention, which will be described subsequently in greater detail, is to provide a new and improved reptile cage apparatus which has all the advantages of the prior art animal cages and none of the disadvantages.

To attain this, the present invention provides an apparatus including a transparent enclosure formed with a plurality of heating sources, including a thermostaticaly controlled resistance heater with a spaced infra-red light source mounted in association with the thermostat to effect heating of the interior of the enclosure. Further, a humidifier in association with the humidistat is mounted in a spaced relationship relative to the heating sources utilizing a separate humidistat to effect selective operation of the humidifier. A flexible heat reflector web is mounted and suspended from an upper framework of the enclosure and directed downwardly thereof that is selectively furled to selectively provide various heat ranges within the enclosure. Further, the transparent web may be formed of flexible fingers to ease access of a reptile contained within the enclosure between spaced heating zones within the enclosure. A cover is also provided for the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreiciate that the conception, upon which this discloser is based, may readily be utilized as a basis for the designing of other structures, methods and systems for carrying out to several purposes of the present invention. It is important, therefore, that the claims be regarded as including such equivalent constructions insofar as they do not depart from the spirit and scope of the present invention.

It is therefore an object of the present invention to provide a new and improved reptile cage apparatus which has all the advantages of the prior art animal cages and none of the disadvantages.

It is another object of the present invention to provide a new and improved reptile cage apparatus which may be easily and efficiently manufactured and marketed.

It is a further object of the present invention to provide a new and improved reptile cage apparatus which is of a durable and reliable construction.

An even further object of the present invention is to provide a new and improved reptile cage apparatus which is susceptible of a low cost of manufacture with regard to both materials and labor, and which accordingly is them susceptible of low prices of sale to the cosuming public, thereby making such reptile cage apparatus economically available to the buying public.

Still yet another object of the present invention is to provide a new and improved reptile cage apparatus which provides in the apparatuses and methods of the prior art some of the advantages thereof, while simultaneously overcoming some of the disadvantages normally associated therewith.

Still another object of the present invention is to provide a new and improved reptile cage apparatus wherein the same utilizes a plurality of heat sources, as well as permitting division of the enclosure defining the cage into separated heating units.

These together with other objects of the invention, along with the various features of novelty which characterize the invention, are pointed out with particularity in the claims annexed to and forming a part of this disclosure. For a better understanding of the invention, its operation advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustraion of a prior art cage apparatus.

FIG. 2 is a further example of an isometric illustration of a prior art cage apparatus.

FIG. 5 is an isometric illustration of the instant invention utilizing the heat reflector web.

FIG. 6 is an isometric illustration of the heat reflector web in a furled configuration.

FIG. 7 is an isometric illustration of a modified heat reflector web.

FIG. 8 is an isometric illustration of a flexible cover utilized by the instant invention.

DESCRIPTION OF THE PREFERRED EMBODIMENT

Figure 3:
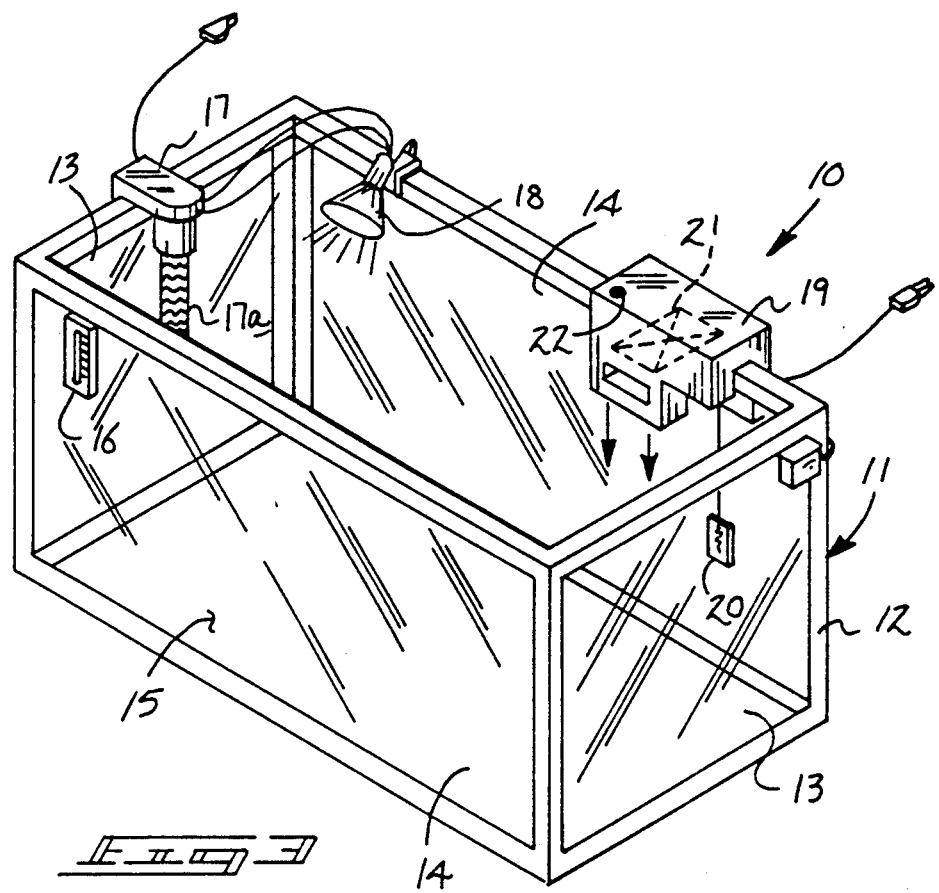
FIG. 3 is an isometric illustration of the instant invention.

With reference now to the drawings, and in particular to FIGS. 1 to 8 thereof, a new and improved reptile cage apparatus embodying the principles and concepts of the present invention and generally designated by the reference numeral 10 will be described.

FIG. 1 illustrates a prior art bird-type cage 1 comprising seed trays 2 spaced exteriorly, with a seeded carpet of grass contained interiorly of the cage, including a vented fan 3 to direct air throughout the cage apparatus to illustrate the use of an enclosure construction for specific types of animal life, such as birds. FIG. 2 illustrates a further animal cage apparatus 4, with a water feeding bottle 5 and exercise tubes 6 with a conduit 7 arranged for receiving additional connecting tubes to additional enclosures, wherein the apparatus 4 is particularly adapted to rodents and the like and houses them in a particular enclosure constructed particularly for that purpose.

More specifically, the reptile cage apparatus 10 of the instant invention essentially comprises a rigid framed transparent enclosure 11 defined by a rigid perimeter framework 12 encompassing transparent panels. The panels include spaced parallel transparent end wall panels 13 orthogonally arranged relative to spaced parallel side wall panels 14. The framework and panel portions are orthogonally mounted to an opaque floor 15.

A thermometer 16 is mounted to a forward side wall panel 14, with an adjacent thermostatically controlled resistance heater 17 formed with a downwardly extending resistance tube 17a extending interiorly within the enclosure suspended from the rigid framework 12 extending downwardly adjacent a rear end wall panel 13. An infra-red light emitting lamp 18 is secured to an upper edge of a rear side wall panel 14 and directed interiorly of the enclosure 11 and is electrically coupled to the thermostat T of the resistance heater 17 to effect simultaneous operation of the resistance heater 17 and the lamp 18. Spaced from the lamp 18 and mounted to the rear side wall panel overlying the framework 12 is a forced air humidifier 19 formed with a rotating fan 21 formed therewithin. The humidifier 19 is operative and energized through a humidistat 20 positioned interiorly of the enclosure 11 suspended from the humidifier 19. A fill plug 22 permits filling of a fluid reservoir associated with the humidifier to permit directing of moisturized air within the enclosure as required.

Figure 4:
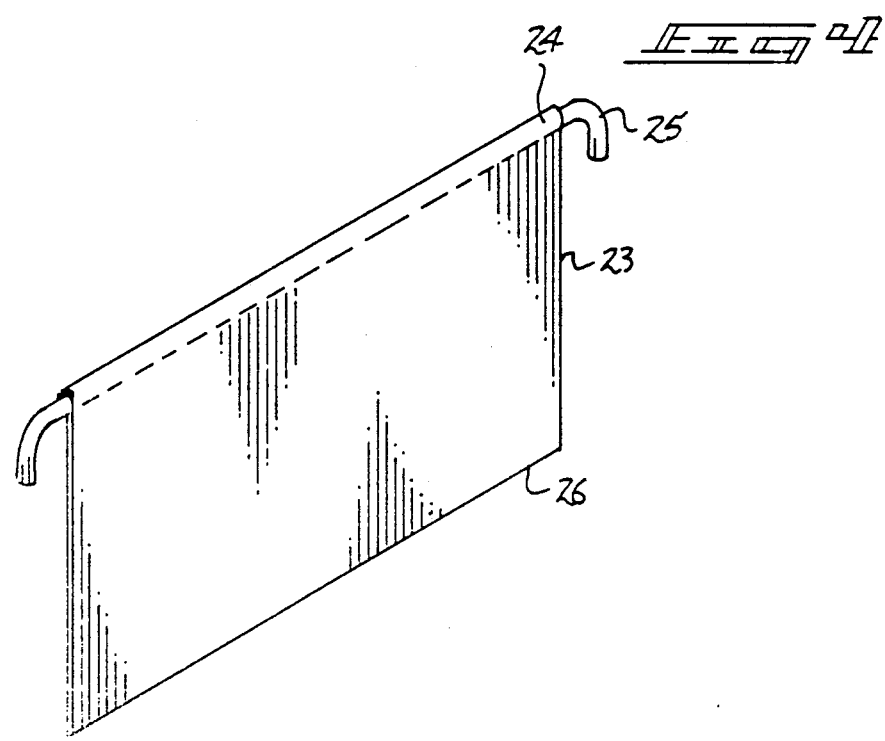
FIG. 4 is an isometric illustration of a heat reflector web utilized by the instant invention.

At times it is desirable to define different heating zones within the enclosure and to this end, a flexible heat reflector web 23 is positionable overlying the spaced transparent panels 14 and their associated framework portions 12. The reflector web 23, as illustrated in FIG. 4, is defined by a width substantially equal to a width defined between the spaced parallel side wall panels 14, with a seamed tube 24 coextensively formed defining an upper edge of the web 23. An inverted "U" shaped rigid rod 25 is fixedly mounted within the tube 24. The rigid rod 25 includes spaced parallel legs to overlie the spaced side walls of the enclosure, and with reference to FIG. 6 for example, permits the web 23 to be furled to permit descent of the web and its lower terminal edge 26 downwardly relative to the enclosure to divide the enclosure as desired into a plurality of heat zones. It should be understood that the lower terminal edge 26 is spaced above the floor 15 to permit a reptile contained within the enclosure access from one zone to the other defined between the divides of the web 23 and the enclosure.

FIG. 7 illustrates a modified flexible heat reflector web 23, wherein the web 23 is formed of adjacent flexible finger web portions 27 to enhance ease of access of an enclosed reptile within the organization to traverse from one heat zone to another defined between opposed sides of the web 23a. As illustrated in FIG., the web 23 divides and separates the heating members 17 and 18 from the humidified portion of the enclosure.

FIG. 8 illustrates a porous covering web 28 utilized for covering the top surface of the enclosure 11 and is defined by a forward, inverted "U" shaped rod 29 spaced and parallel from a rear inverted "U" shaped rod 30. The rear rod 30 includes a cylindrical support core 32 to mount a rear terminal end of the central opaque porous fabric web 31 thereto, with the forward "U" shaped rod 29 mounted within a forward tube 33 defining the forward terminal end of the web 31. Understandably, the cylindrical support core 32 permits furling of the web 31 about the core 32 to vary air flow through the web. Understandably, however, the fabric web 31 formed of porous construction also permits a degree of air flow therethrough for enhanced comfort and protection of a reptile contained within the enclosure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A reptile cage apparatus comprising, in combination, a framed transparent enclosure, the transparent enclosure including a rigid perimeter framework, the perimeter framework including a transparent forward end wall and a transparent rear end wall spaced away from and parallel to the forward wall, and a transparent forward end side wall spaced away from and parallel to a transparent rear side wall, and the walls orthogonally mounted integrally to an underlying opaque floor, and a heating means mounted on the framework for providing selective heating of an interior of the enclosure, and a humidifier means mounted on the framework for providing selective humidification of the enclosure, and wherein the heating means includes a first heating means mounted to an upper end of the rear end wall, and a second heating means mounted to upper end of the rear side wall, and a thermometer mounted to an interior surface of the forward side wall to provide visual observation of temperature within the enclosure, and wherein the first heating means includes a resistance heater and a thermostat, and the second heating means includes an infra-red lamp directed interiorly of the enclosure and operatively associated with the thermostat to permit recurrent heating by the resistance heater and the infra-red lamp, and wherein the humidifier includes a fan mounted interiorly thereof, the fan operatively associated with a humidistat, wherein the humidistat is mounted interiorly of the enclosure and suspended from the humidifier, and the humidifier further includes a fill plug to permit directing of water interiorly of the humidifier, and further including a flexible heat reflector web selectively mounted within the enclosure, the heat reflector web including a flexible web including a lower terminal edge and an upper terminal edge, the upper terminal edge defined by a tube, and a "U" shaped rigid rod captured within the tube, the rigid rod spanning the forward and rear side walls of the enclosure, and fixedly mounted within the tube to permit furling of the web about the "U" shaped rigid rod.

2. An apparatus as set forth in claim 1 wherein the lower terminal edge of the web is spaced above the opaque floor, and the web is defined by a predetermined width substantially equal to a further predetermined width defined between the forward and rear side walls of the enclosure.

3. An apparatus as set forth in claim 2 wherein the web is defined by aligned adjacent finger webs extending from the tube to the lower terminal edge of the web to permit enhanced ease of access of a reptile contained within the enclosure.

4. An apparatus as set forth in claim 3 further including a covering web, and the covering web defined by a porous fabric web structure including a forward terminal end including a coextensive forward terminal end tube, and a forward "U" shaped rod captured within the tube, wherein the forward "U" shaped rod is positioned to extend beyond upper terminal ends of the forward and rear side walls, and the fabric web structure further including a rear terminal end fixedly mounted to a cylindrical support core, and the support core rigidly mounting a rear inverted "U" shaped rod therewithin to permit furling of the fabric web about the cylindrical support core.

* * * * *